United States Patent [19]
Aaker et al.

[11] Patent Number: 5,930,252
[45] Date of Patent: Jul. 27, 1999

[54] METHOD AND APPARATUS FOR QUEUING AND TRIGGERING DATA FLOW STREAMS FOR ATM NETWORKS

[75] Inventors: Kenneth Dale Aaker; Gary Scott Delp, both of Rochester, Minn.; Stephen Gouze Luning, Austin, Tex.; Jeffrey James Lynch, Apex, N.C.

[73] Assignee: International Business Machines Corporation, Armonk, N.Y.

[21] Appl. No.: 08/763,524

[22] Filed: Dec. 11, 1996

[51] Int. Cl.[6] ........................................................ H04J 3/24
[52] U.S. Cl. .......................... 370/395; 370/522; 370/537; 370/538; 348/7; 348/12; 395/200.33
[58] Field of Search ...................... 370/395, 412, 370/465, 468, 522, 537, 538, 389; 348/7, 12; 395/200.33, 200.61, 200.62

[56] References Cited

U.S. PATENT DOCUMENTS

| | | | |
|---|---|---|---|
| 5,533,020 | 7/1996 | Byrn et al. | 370/60.1 |
| 5,533,021 | 7/1996 | Branstad et al. | 370/60.1 |
| 5,537,408 | 7/1996 | Branstad et al. | 370/79 |
| 5,625,846 | 4/1997 | Kobayakawa et al. | 370/412 |
| 5,652,749 | 7/1997 | Davenport et al. | 370/466 |
| 5,742,599 | 4/1998 | Lin et al. | 370/395 |
| 5,745,696 | 4/1998 | Mendelson et al. | 370/468 |
| 5,758,087 | 5/1998 | Aaker et al. | 370/389 |
| 5,761,417 | 6/1998 | Henley et al. | 348/7 |
| 5,793,412 | 8/1998 | Asamizuya | 348/7 |

OTHER PUBLICATIONS

U.S. Patent Application Serial No. 08/664,131 filed Jun. 14, 1996 for "Apparatus and Method for Predicted Response Generation", Aaker et al.

ITU–T Recommendation Q.2110, "B–ISDN ATM Adaptation Layer–Service Specific Connection Oriented Protocol (SSCOP)", by Telecommunication Standardization Sector of ITU, Jul. 1994.

The ATM Forum Technical Committee "Audiovisual Multimedia Services: Video on Demand Specification 1.0", af–saa–0049.000 Letter Ballot, Dec. 1995.

ITU–T Draft revised Recommendation 1.363.5, "B–ISDN ATM Adaptation Layer (AAL) Type 5 Specification", by Telecommunication Standardization Sector of ITU, May 1996.

Draft ITU–T Recommendation H.310, "Broadband Audiovisual Communication Systems and Terminals", by Telecommunication Standardization Sector of ITU, Jun. 8, 1996.

ATM Forum Technical Committee, Annex A–G, Video on Demand Specification 1.0, af–saa–0049.000 Letter Ballot.

*Primary Examiner*—Chi H. Pham
*Assistant Examiner*—Frank Duong
*Attorney, Agent, or Firm*—Joan Pennington

[57] ABSTRACT

An improved method and apparatus are provided for queuing and triggering the flow of data across ATM networks. A connection is established between an insertion server and a client multiplexer. The insertion server prepares a timing response and establishes a transmit queue threshold for a pending trigger point for inserting data. The insertion server enqueues data. Responsive to receiving a timing request from the client multiplexer, the insertion server sends the timing response. Responsive to receiving a stream request from the client multiplexer, the insertion server transfers the enqueued data. The client multiplexer includes a timer for identifying an offset time between sending the timing request and receiving a timing response from the insertion server. The client multiplexer uses the offset time to set a count down timer for sending the stream request. The client multiplexer processes the data transferred by the insertion server and optionally sends a stop stream command to the insertion server.

28 Claims, 11 Drawing Sheets

| PAYLOAD | AAL5 TRAILER | | | |
|---|---|---|---|---|
| NULL IN THE UPSTREAM DIRECTION MPEG-2 DATA IN DOWNSTREAM DIRECTION | CPCS-UU TRIGGER MANAGER COMMANDS & RESPONSES | CPI | 2 BYTE LENGTH | 4 BYTE CRC |

PRIOR ART

PRIOR ART

OPERATIONAL
FLOW
DIAGRAM

FIG.3

FIG. 4B   SERVER OPERATIONS   DATA TRANSFER STATE

FIG.5  CLIENT OPERATIONS

| PAYLOAD | AAL5 TRAILER | | |
|---|---|---|---|
| TRIGGER MANAGER COMMANDS & RESPONSES | CPCS-UU | CPI | 2 BYTE LENGTH | 4 BYTE CRC |

FIG. 7

| PAYLOAD | AAL5 TRAILER | | |
|---|---|---|---|
| NULL IN THE UPSTREAM DIRECTION MPEG-2 DATA IN DOWNSTREAM DIRECTION | CPCS-UU TRIGGER MANAGER COMMANDS & RESPONSES | CPI | 2 BYTE LENGTH | 4 BYTE CRC |

FIG. 8

METHOD AND APPARATUS FOR QUEUING AND TRIGGERING DATA FLOW STREAMS FOR ATM NETWORKS

FIELD OF THE INVENTION

The present invention relates to the data processing field, and more particularly, relates to a method and apparatus for queuing and triggering the flow of data across data communications networks including ATM networks, for example, to support such applications a s inserting commercials into a MPEG-2 data stream.

DESCRIPTION OF THE PRIOR ART

The MPEG-2 Standard is defined by the Moving Picture Experts Group (ISO/IEC JTC1/SC29/WG11). The standard supports constant and/or variable rate encoding that allow s for variable bandwidth and quality of video streams. It also defines a sy stem layer that integrates multiple media sources into a single data stream with integrated time stamps. The Systems layer supports the sending of information encoded using a variety of video and audio data compression techniques such as MPEG1 or MPEG-2 video or audio.

MPEG-2 consists of three core functions: MPEG-2 Video, MPEG-2 Audio, and MPEG-2 Systems.

MPEG-2 Video specifies the coded bit stream for high-quality digital video. In addition to being compatible with the MPEG-1 Video Standard (ISO/IEC IS 11172-2), MPEG-2 also supports interlaced video formats, increased image quality, several picture aspect ratios, and a number of other advanced features needed for high definition television (HDTV).

The MPEG-2 Audio coding supports up to five full bandwidth channels (left, right, center, and two surround channels), and/or up to seven commentary/multilingual channels. The MPEG-2 Audio Standard also provides improved quality coding of mono and conventional stereo signals for bit-rates at or below 64 kbits/s.

The Motion Pictures Experts Group (MPEG) standard for MPEG-2 stream transport is described in ITU-T Recommendation H.222.0-ISO/IEC 13818-1 (1995) Generic Coding of Moving Pictures and Associated Audio Information: Systems, International Organization for Standardisation, Organization Internationale De Normalisation (ISO/IEC JTC1/SC29/WG11).

The MPEG-2 Systems Standard specifies how to combine multiple audio, video, and private-data streams into a single multiplexed stream. It performs packetized stream control/synchronization and is designed to support a wide range of broadcast, telecommunications (interactive), computing, and storage application.

The MPEG-2 Systems defines two kinds of streams: Program and Transport Streams. The Systems Layer processes the compressed video codec, audio codec, and data streams in two steps:

1. First the codec/data (elementary) streams are combined with system level information and packetized to produce Packetized Elementary Streams (PESs).
2. The PESs are then combined to form either a Program Stream or a Transport Stream.

The Program Stream supports the creation of a single audio-visual program, which could have multiple views and multichannel audio. It utilizes variable length packets and is designed for transmission in relatively error-free environments.

The Transport Stream multiplexes a number of programs, comprised of video, audio, and private data, for transmission and storage using a wide variety of media. It performs packetized stream control and synchronization. It is designed for transmission in a lossy or noisy environment and utilizes a fixed size 188 byte packet.

The MPEG-2 multimedia stream may be transported over a digital network which uses the ITU standards commonly referred to as Asynchronous Transfer Mode (ATM). The Asynchronous Transfer Mode (ATM) network described in "Asynchronous Transfer Mode: Solution for Broadband ISDN", M de Prycker, Ellis Horwood, 1991 is an internationally agreed upon technique for transmission, multiplexing and switching in a broadband network. It uses fixed size cells as a unit of transmission.

ATM networks are designed to support the integration of high quality voice, video, and high speed data traffic. U.S. patent application Ser. No. 08/664,131 filed Jun. 14, 1996 by Aaker et al., discloses method and apparatus for predicted response generation in a computer communications network system. U.S. Pat. Nos. 5,533,021 and 5,537,408 disclose method and apparatus for segmenting and timing the transmission of a multimedia digital data stream over an ATM network. U.S. Pat. No. 5,533,020 discloses method and apparatus for scheduling the transmission of cells in multiple data streams over a common communications link.

Figure 1A:
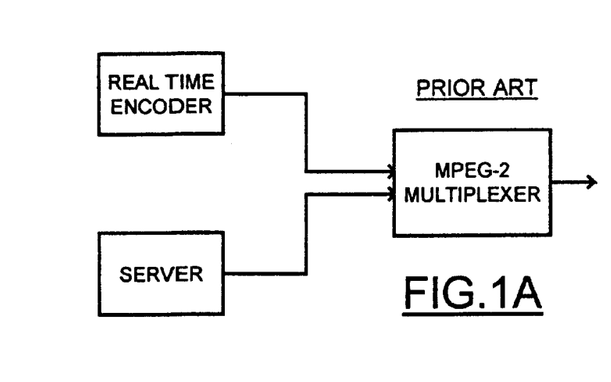
FIG. 1A is a block diagram representation of a prior art arrangement for supporting such applications as inserting commercials into an MPEG-2 data stream.

In FIG. 1A, a prior art arrangement is shown for supporting such applications as inserting commercials into an MPEG-2 data stream. The illustrated prior art arrangement of FIG. 1A includes a MPEG-2 multiplexer receiving a first input stream from a real-time encoder and a second input stream from a server with stored video and audio data, such as a commercial. Various other configurations are possible, for example, two servers could be used, one sending a feature movie and the other sending commercials or one server could be used for sending a feature film on one virtual connection (VC) and sending the commercial on a second VC. Also, configurations with more than two input streams are possible. Both the real-time encoder and server are capable of sending MPEG-2 encoded streams.

The MPEG-2 multiplexer can either mix the input streams and generate a multi-program Transport Stream or select one stream or the other to send out as a single program transport stream. In known arrangements, synchronized and tightly coupled electronic interfaces are required to control the flow of information between the mixers or MPEG-2 multiplexers and the source devices, such as tape players.

Figure 1B:
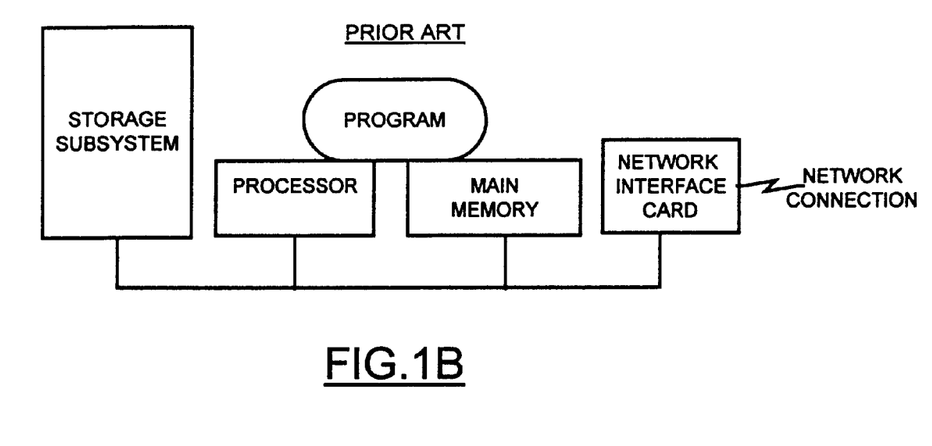
FIG. 1B is a block diagram representation of a prior art file server arrangement.
Figure 1C:
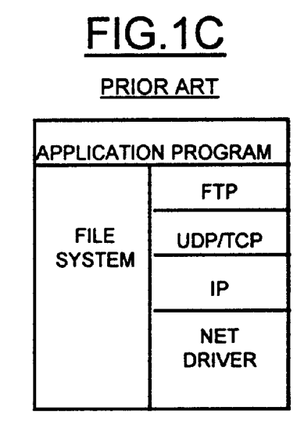
FIGS. 1C and 1D illustrate alternative prior art protocol stacks of the conventional file server arrangement of FIG. 1B.
Figure 1D:
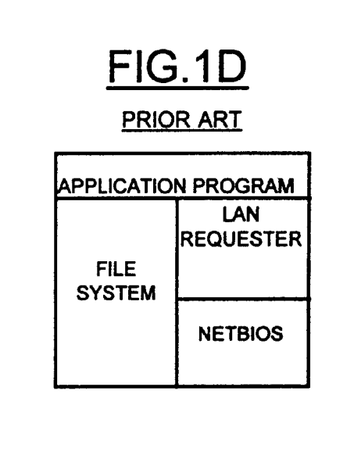

A conventional file server is shown in FIG. 1B including a storage subsystem, a main store or system memory, a processor and a network interface card. A stored program running on the processor implements a file system and supports access to that file system from the network using, for example either file transfer protocol (FTP), user datagram protocol (UDP)/transmission control protocol (TCP) and the internet protocol (IP) as shown in FIG. 1C or LAN Requester and NetBIOS as shown in FIG. 1D.

Figure 1E:
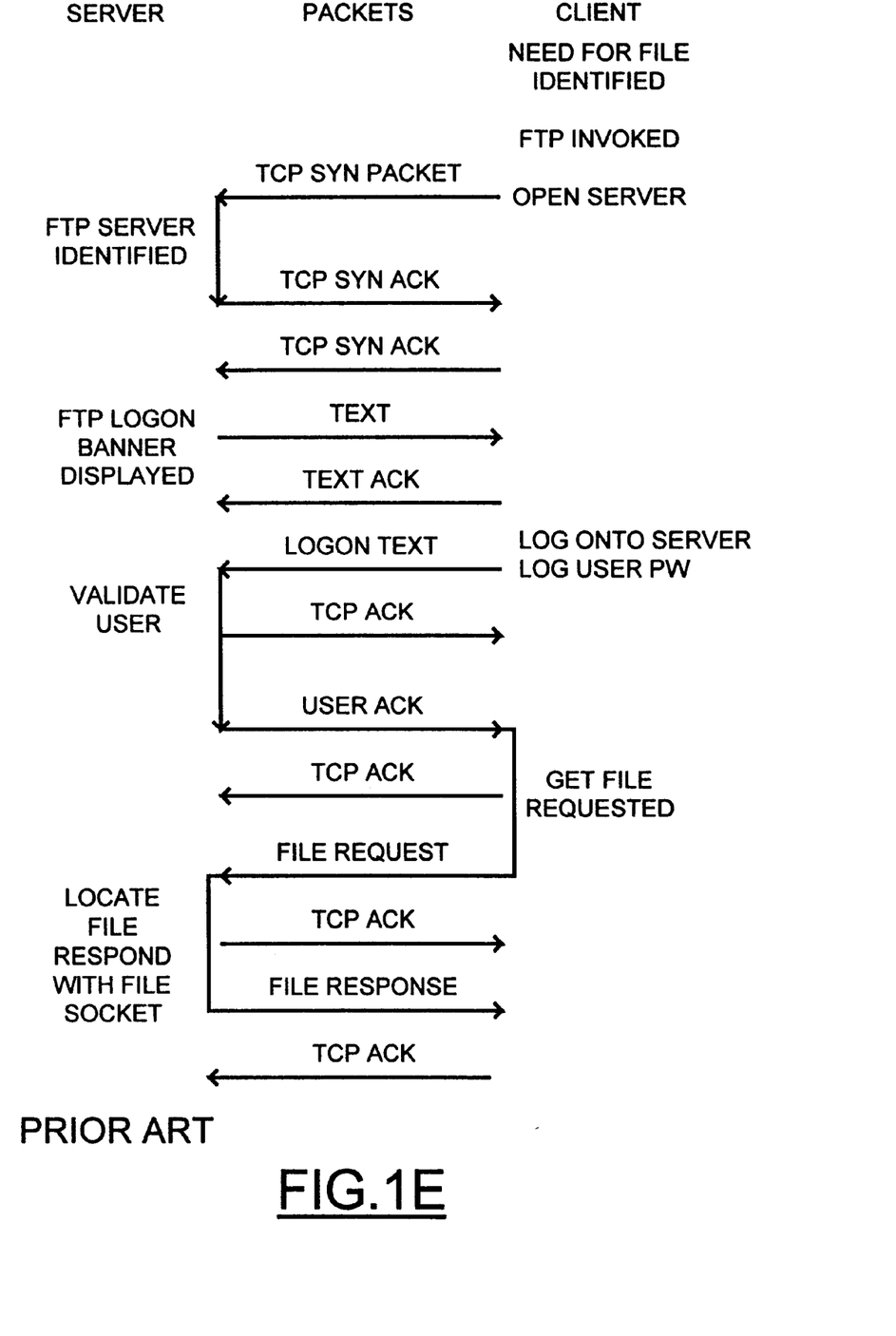
FIGS. 1E and 1F together provide a chart illustrating prior art sequential operations of the conventional file server arrangement of FIG. 1B.
Figure 1F:
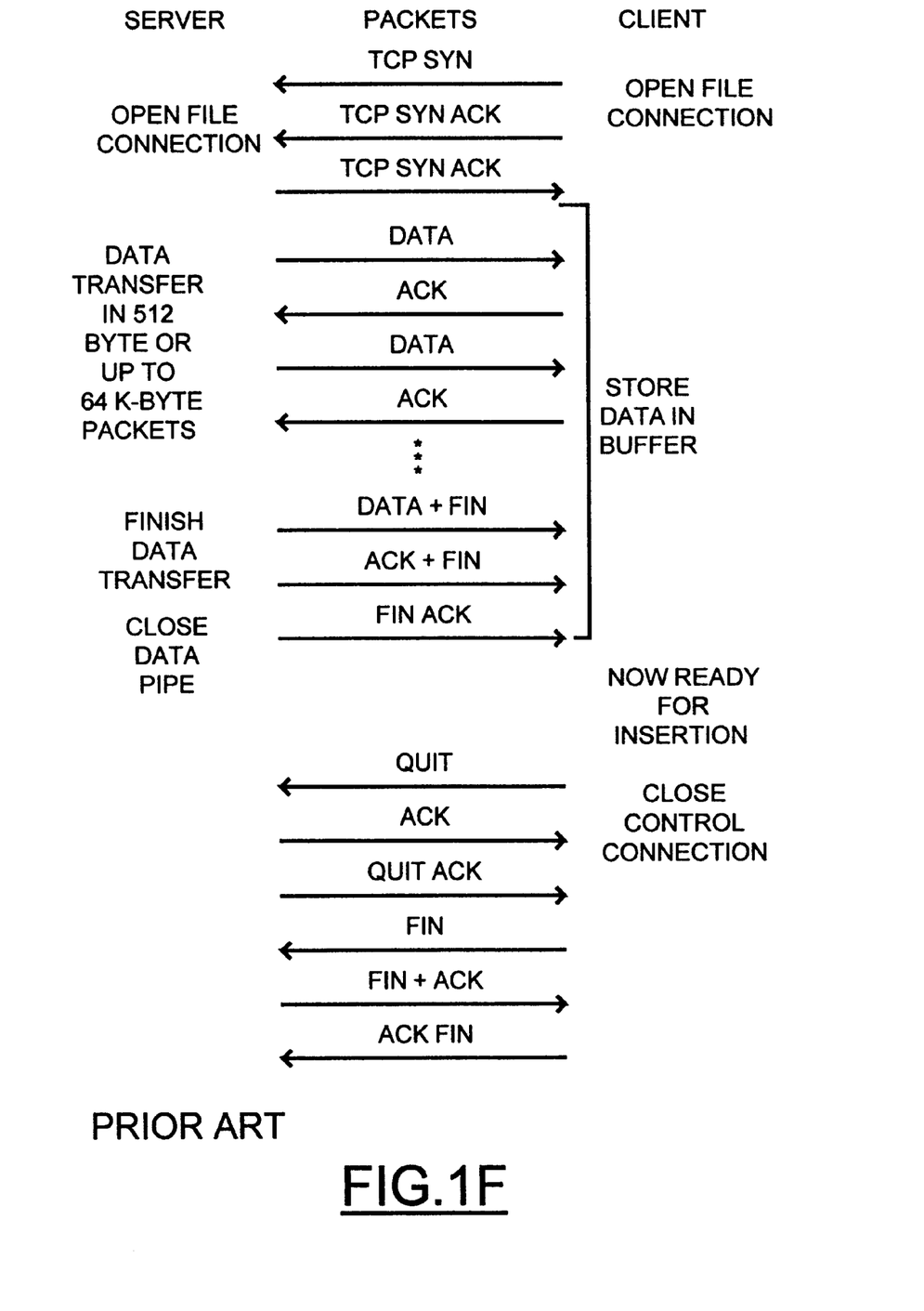

A conventional file server sequence is shown in FIGS. 1E and 1F. Using the conventional file server approach, the multiplexer sends a file request when data is needed. The multiplexer can either download the entire file that is to be inserted or prefetch portions of file before it is time to insert the segment into the ongoing stream. Standard protocols such as TCP and FTP or LAN server structures do not provide performance guarantees. If the partial-initial delivery scheme is used, then it is possible that the insertion will begin and during the delivery of the insertion via the multiplexer, the TCP/FTP source will be delayed so that no data would be available for transmission. This would be contrary to the intent of the system. Buffering is often used to reduce the probability of data delivery gaps. Depending on the peak file transfer rate (R), and the size of the file containing the insertion data (S), the transfer must begin at least S/R seconds before the insertion is to occur. S amount of buffer is required in the multiplexer, in addition to any other buffering necessary. This incurs significant overhead in the file server and multiplexer and a significant delay of at least S/R seconds.

Figure 1G:
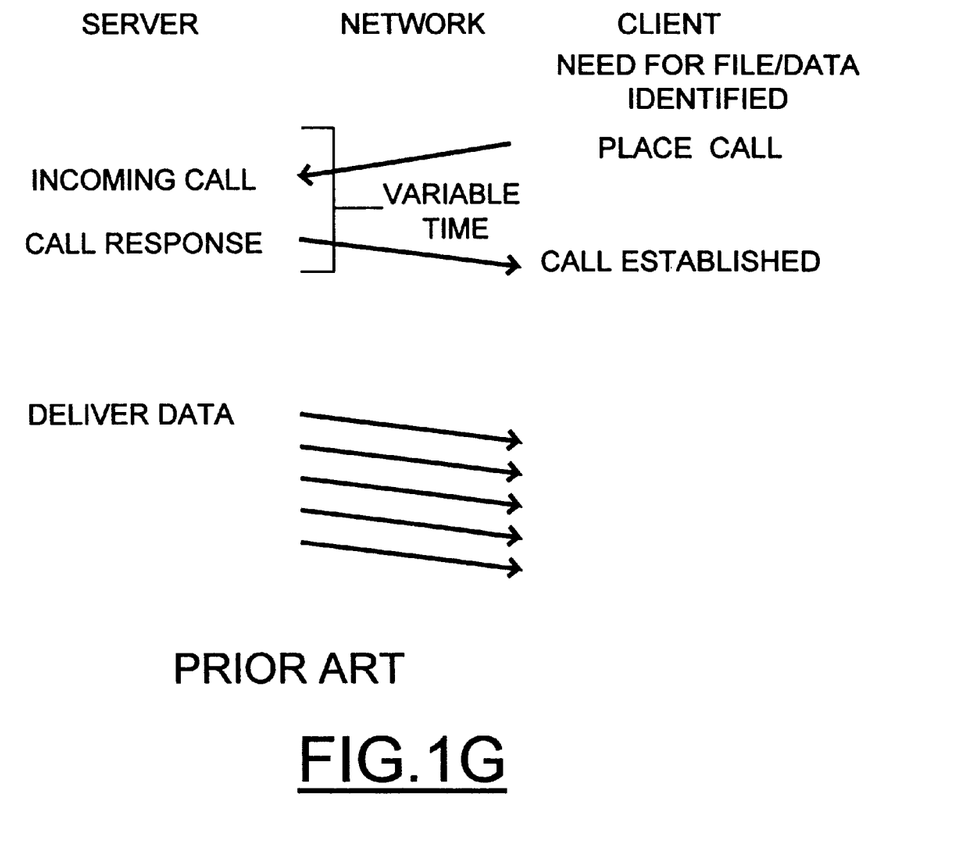
FIG. 1G is a chart illustrating alternative prior art sequential operations of a second conventional approach of the file server arrangement of FIG. 1B.

A second conventional approach illustrated in FIG. 1G is described in the "Audiovisual Multimedia Services: Video-on-Demand Specification 1.0" from the ATM Forum. As soon as the ATM connection is established, the server begins to stream the data to the client. Unfortunately the ATM Virtual Circuit (VC) setup procedure can take a variable amount of time to complete. This requires the connection procedure be started well in advance of the time the data is needed to ensure that the VC is established by the time the data is actually needed. Using this second approach there must be a first-in first-out (FIFO) buffer at the client multiplexer. Given the fact that there may be, for example, 1–5 seconds of variation in the amount of time that it takes to set up an ATM connection, and that there may be an additional, for example, 1–5 seconds of variation in the time that it takes to stage the data and start the ATM MPEG-2 stream, the multiplexer must provide at least, for example, several seconds of FIFO buffering for the insertion just to protect against or remove the variation of delivery.

SUMMARY OF THE INVENTION

Important objects of the present invention are to provide an improved method and apparatus for queuing and triggering the flow of data across data communications networks including ATM networks; to provide such method and apparatus substantially without negative effects and that overcome some disadvantages of prior art arrangements.

In brief, an improved method and apparatus are provided for queuing and triggering the flow of data across data communications networks including ATM networks. A connection is established between an insertion server and a client multiplexer. The insertion server prepares a timing response for a pending trigger point for inserting data. The insertion server enqueues data. Responsive to receiving a timing request from the client multiplexer, the insertion server sends the timing response. Responsive to receiving a stream request from the client multiplexer, the insertion server transfers the enqueued data.

The client multiplexer includes a timer for identifying an offset time between sending the timing request and receiving a timing response from the insertion server. The client multiplexer uses the offset time to set a count down timer for sending the stream request. The client multiplexer processes the data transferred by the insertion server and optionally sends a stop stream command to the insertion server.

BRIEF DESCRIPTION OF THE DRAWING

The present invention together with the above and other objects and advantages may best be understood from the following detailed description of the preferred embodiments of the invention illustrated in the drawings, wherein.

DETAILED DESCRIPTION OF THE PREFERRED EMBODIMENTS

Figure 2:
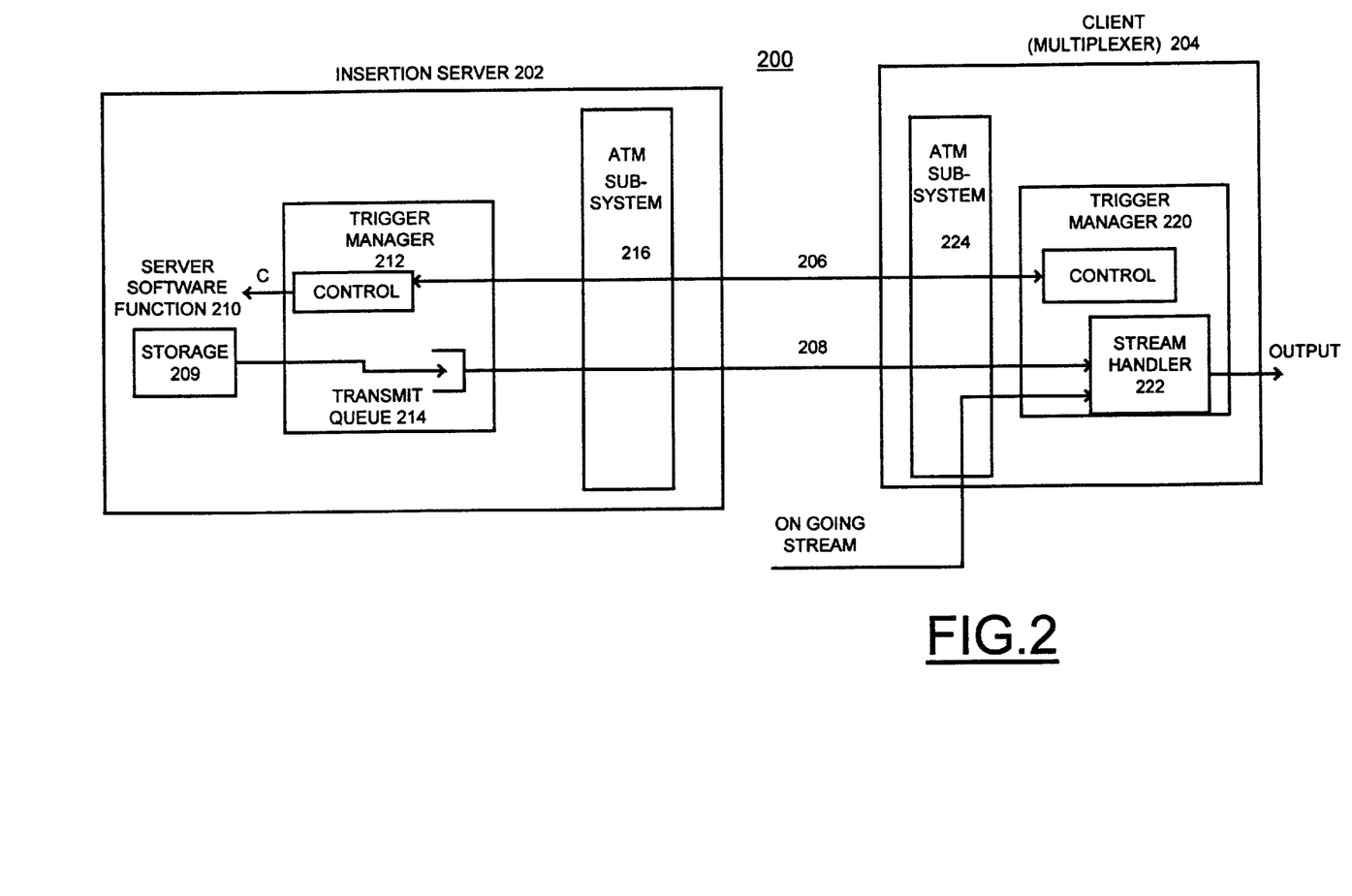
FIG. 2 is a block diagram representation of a preferred ATM communications network system of the preferred embodiment.

Having reference now to the drawings, in FIG. 2, there is shown a preferred ATM communications network system generally designated by the reference character 200 which may be employed to implement the method of the preferred embodiment. The preferred ATM communications network system 200 includes an insertion server 202 and a client 204, shown as an MPEG-2 multiplexer in the illustrated example of FIG. 2. The preferred ATM communications network system 200 provides a just-in-time delivery of the MPEG-2 data inserted by the insertion server 202 and separates the process into two phases including a lock-and-load phase and a trigger phase. During the lock-and-load phase, a virtual circuit VC is set up and the MPEG-2 data is enqueued by the insertion server 202 before being transmitted. During the trigger phase, the client 204 requests the data to be transmitted just before the data to be inserted is needed. In the preferred ATM communications network system 200, the data trigger mechanism is provided at a low protocol layer to reduce latency. The preferred ATM communications network system 200 is illustrated in simplified and diagrammatic form sufficient for an understanding of the present invention. The utility of the present invention is not restricted to the details of a particular insertion server or client multiplexer arrangement.

The preferred ATM communications network system 200 includes the insertion server 202 and the client multiplexer 204 having two logical connections 206 and 208 between the server 202 and client 204. The first connection 206 is a control flow. The client 204 and server 202 exchange commands and responses on the control flow connection 206. The second logical connection 208 is the data flow. The data flow connection 208 is the path for the application information stored in memory or a data storage 209, for example a commercial to be inserted in an on-going stream including MPEG-2 video, audio, and data. Alternatively, both the control flow connection 206 and the data flow connection 208 can be provided over a single full duplex channel.

The insertion server 202 includes server software function 210 consists of the system software and functions such as database and storage management, and the like that make the server 202 work. The insertion server 202 includes a trigger manager 212 which manages a transmit queue 214. The server trigger manager 212 will not allow any data to flow through the transmit queue 214 until a predefined signal or stream request command is received from the client multiplexer 204. The client multiplexer 204 must send this signal or stream request command for starting the flow of data on the control flow connection 206 to the server 202. The trigger manager 212 also monitors the transmit queue 214 and informs the server software function 210 when more data is required, as indicated at line labeled C.

Figure 6:
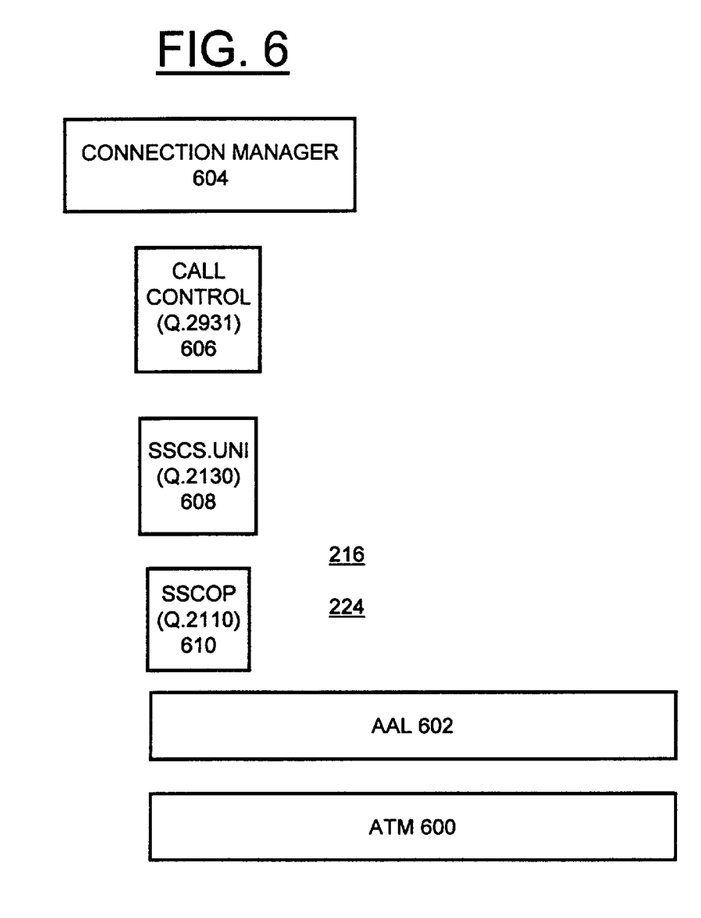
FIG. 6 is a block diagram representation of an ATM subsystem of the preferred ATM communications network system of the preferred embodiment of FIG. 2.

The insertion server 202 includes an asynchronous transfer mode (ATM) subsystem 216. Referring also to FIG. 6, the ATM subsystem 216 consists of the ATM 600 and ATM Adaptation Layer (AAL) 602 and associated control protocols for establishing connections and managing virtual circuits (VCs) including a connection manager 604, a call control 606, a service specific convergence sublayer (SSCS) user network interface (UNI) 608, and a service specific connection oriented protocol (SSCOP) 610. In FIG. 6, Telecommunication Standardization Sector of International Telecommunication Union (ITU-T) Recommendation Q.2931 describes the call control protocol 606, ITU-T Recommendation Q.2130 describes SSCS.UNI protocol 608 and ITU-T Recommendation Q.2110 describes SSCOP protocol 610.

SSCOP protocol 610 provides assured data delivery between AAL connection endpoints. SSCS.UNI protocol 608 provides user network interface to services of SSCOP protocol 610. Call control protocol 606 is the protocol for establishing and maintaining connections across an ATM network. Connection manager 604 is the application level software for managing the ATM subsystem. It should be understood that the ATM subsystem 216 can be implemented as a combination of adapter hardware, microcode, and system software.

The client multiplexer 204 includes a trigger manager 220 which notifies the server 202 when the data stream should start. The client trigger manager 220 also has the capability to determine the round trip latency that is likely to occur when the client multiplexer 204 requests the data to be inserted. The client multiplexer 204 includes a stream handler 222 for processing the data sent by the server 202. The MPEG-2 multiplexer 204 receives two (or more) input streams at the data connection 208 and the on-going data stream, such as a movie or real time recorded event. The client multiplexer 204 selects one stream or the other to send out as a single program transport stream at the output of the stream handler 222, as indicated at a line labeled OUTPUT. The MPEG-2 multiplexer 204 uses the splice point support in the MPEG-2 Transport Stream including a count down indicator, discontinuity indicator, and the like to identify where a switch should be made. The client multiplexer 204 includes an asynchronous transfer mode (ATM) subsystem 224, as shown in FIG. 6 consists of the ATM 600 and ATM Adaptation Layer (AAL) 602 and the associated control protocols 604, 606, 608, 610 for establishing connections and managing Virtual Circuits (VC). The ATM subsystem 224 can be implemented as a combination of adapter hardware, microcode, and software.

Figure 3:
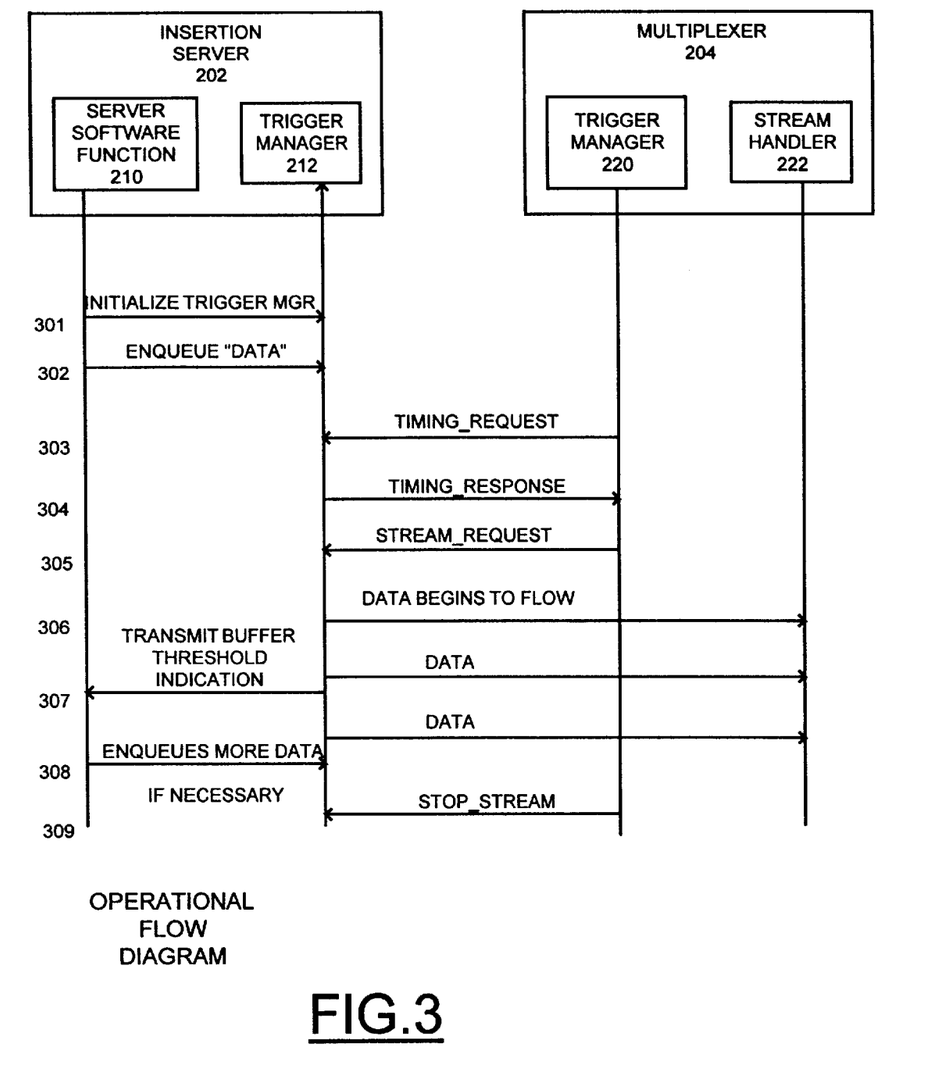
FIG. 3 is an operational flow diagram of the preferred ATM communications network system of the preferred embodiment of FIG. 2.

Referring now to FIG. 3, an operational flow diagram of the preferred ATM communications network system 200 of the preferred embodiment is shown. The server 202 and the multiplexer 204 are informed that a trigger point is going to be reached. For example, an external control protocol that coordinates the action of each of the various components 202 and 204, an administrative procedure or time of day indication is provided to the server 202 and the multiplexer 204 for an upcoming trigger point. The server 202 is told which file stored in memory 209 must be sent.

At a step 301, the server software function 210 configures the trigger manager 212. An Initialize Trigger Manager Primitive provides the necessary information to configure the trigger manager 212. The trigger manager 212 prepares the timing response and sets a Transmit Queue Threshold value. A Transmit Buffer Threshold Indication primitive is signaled by the trigger manager 212 whenever the transmit queue 214 drops below the Transmit Queue Threshold value. When the transmit queue 214 drops below this Transmit Queue Threshold value, the trigger manager 212 notifies the server software function 210 so more data can be enqueued, if more data is available. This ensures an uninterrupted supply of enqueued data when the server 202 is transmitting data. A connection between the server 202 and the client 204 is established. The connection can occur anytime prior to the client 204 needing the data.

At step 302, to improve the response time, the server software function 210 enqueues the data to the transmit queue 214 of the ATM subsystem 216. The trigger manager 212 then waits for the client 204 to ask for the data.

At an optional step 303, the client (multiplexer) 204 sends a timing request command. At an optional step 304, the server trigger manager 212 loops this command back as a timing response. The timing response is sent by the server 202 in response to a timing request command. The timing request command is used in conjunction with the timing response as a measure of the round trip latency that is likely to occur between the client 204 sending the stream request command and data being received from the server 202. The stream request command starts the stream of data. The client 204 uses the round trip delay determined from the timing request and the timing response to gauge the amount of time in advance that is needed to request the data stream. By having a measure of this expected round trip delay the client 204 can time arrival of the data stream so that the data arrives just-in-time to be processed. As a result, the amount of buffering needed in the client multiplexer 204 is minimized.

At step 305, when the client multiplexer 204 determines that it needs the enqueued data from the server 202, client 204 sends the stream request command. When the server 202 receives the stream request command, data traffic is enabled for the VC 308 carrying the video and audio MPEG-2 stream. At step 306, data begins to flow.

Following step 306, the trigger manager 212 monitors the transmit queue. At step 307, when the transmit queue 214 drops below the Transmit Queue Threshold value, the trigger manager 212 signals a Transmit Buffer Threshold Indication to the server software function 210.

At step 308, if there is more data to send, the server software function 210 enqueues additional data to the transmit queue 214. At step 309, when the client 204 wants the stream to stop, it sends a stop stream command. The stop stream command stops the stream of data. The server 202 halts the flow of data through the transmit queue 214.

Figure 4A:
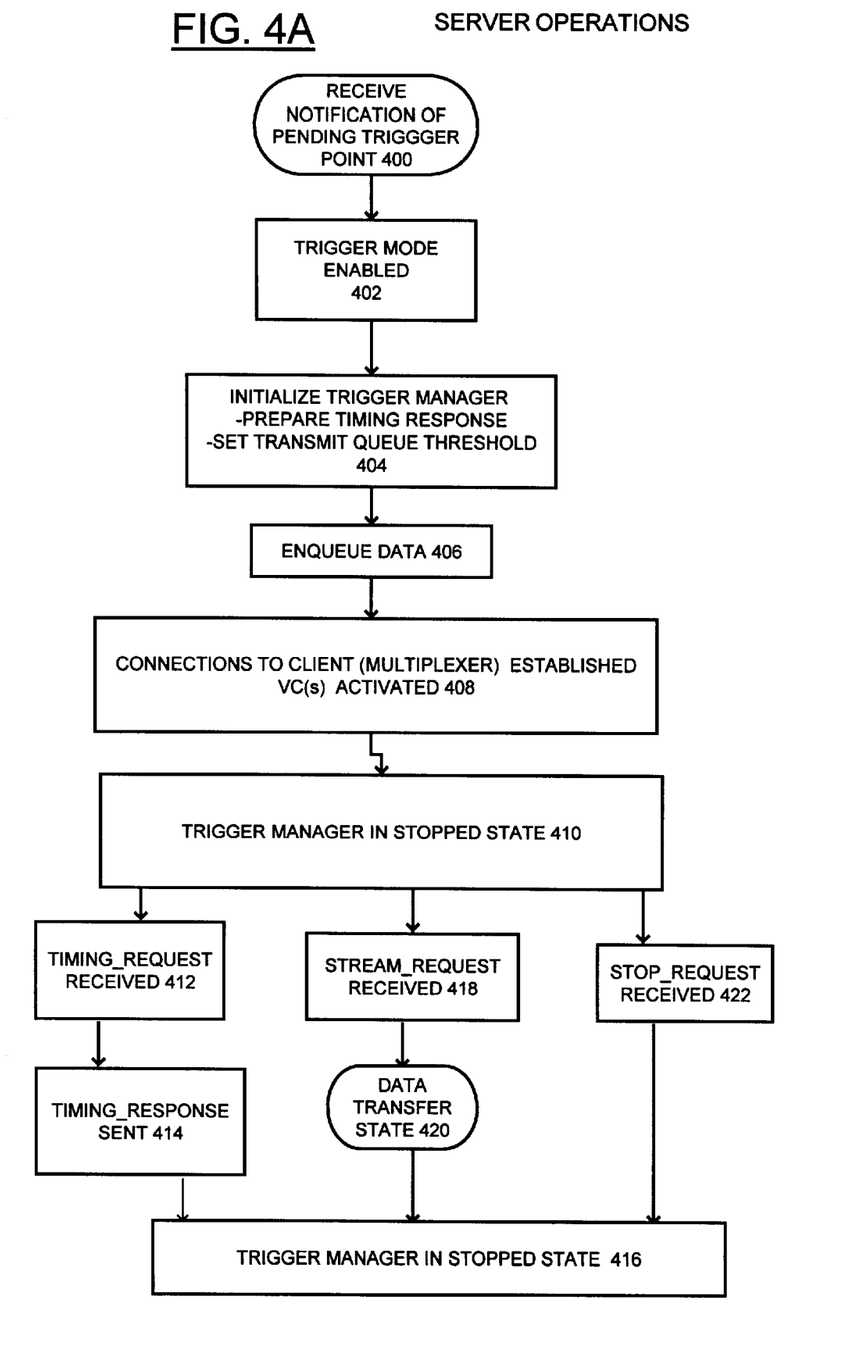
FIGS. 4A and 4B are flow charts illustrating logical steps performed by a server processor of the preferred ATM communications network system of the preferred embodiment of FIG. 2.
Figure 4B:
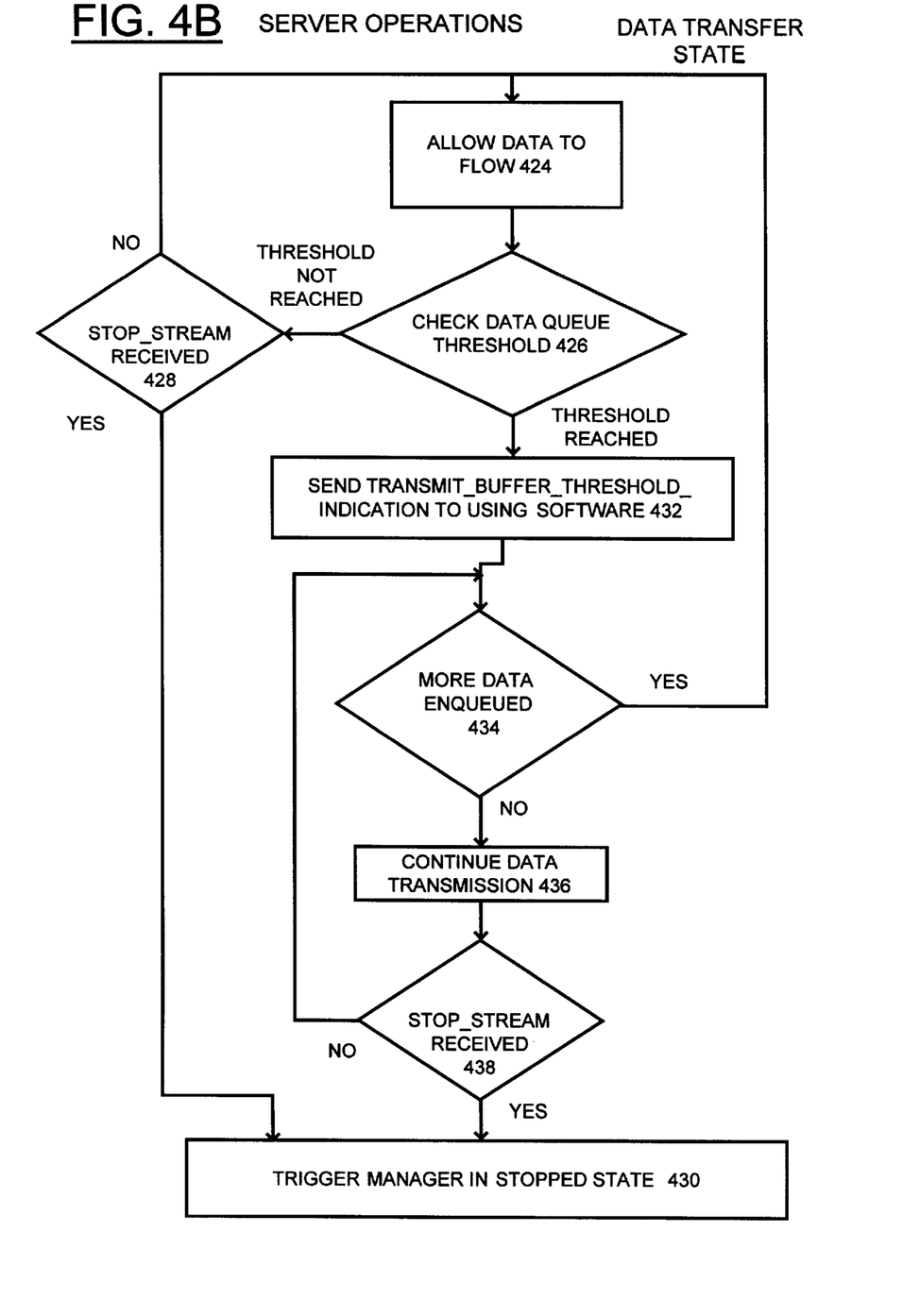

Referring to FIGS. 4A and 4B, flow charts illustrating logical steps performed by a server 202 are shown. A notification of a pending trigger point is received as indicated at a block 400. The trigger mode is enabled as indicated at a block 402. The trigger manager 212 is initialized as indicated at a block 404 with a timing response prepared and a transmit queue threshold set. Next data is enqueued into the transmit queue 214 as indicated at a block 406. Connections to the client 204 are established and VCs are activated as indicated at a block 408. Then the trigger manager 212 is left in the stopped state as indicated at a block 410. When a timing request is received as indicated at a block 412, then the timing response is sent as indicated at a block 414. The trigger manager 212 is left in the stopped state as indicated at a block 416. When a stream request is received as indicated at a block 418, then a data transfer state is established as indicated at a block 420 and the trigger manager 212 is left in the stopped state as indicated at block 416. A stop stream is received as indicated at a block 422, then the trigger manager 212 is left in the stopped state as indicated at block 416.

Referring to FIG. 4B, the sequential steps of the data transfer state established at block 420 in FIG. 4A are shown starting as indicated at a block 424 with data allowed to flow. Checking of the data queue threshold is provided as indicated at a decision block 426. When a threshold is not reached, then checking for a received stop stream command is provided as indicated at a decision block 428. When a stop st ream command is identified at decision block 428, then the data transfer is s topped as indicated at a block 430. Otherwise, when determined at decision block 426 that the data queue threshold is reached, then a transmit buffer threshold indication is sent to the server software function 210 as indicated at a block 432. Checking for more enqueued data is performed as indicated at a decision block 434. When more enqueued data is identified at decision block 434, then the sequential operations return to block 424. Otherwise, when no more enqueued date is found, then the data transmission is continued as indicated at a block 436, until a stop stream command is identified as indicated at a decision block 438. Then the data transfer is stopped as indicated at block 430.

Figure 5:
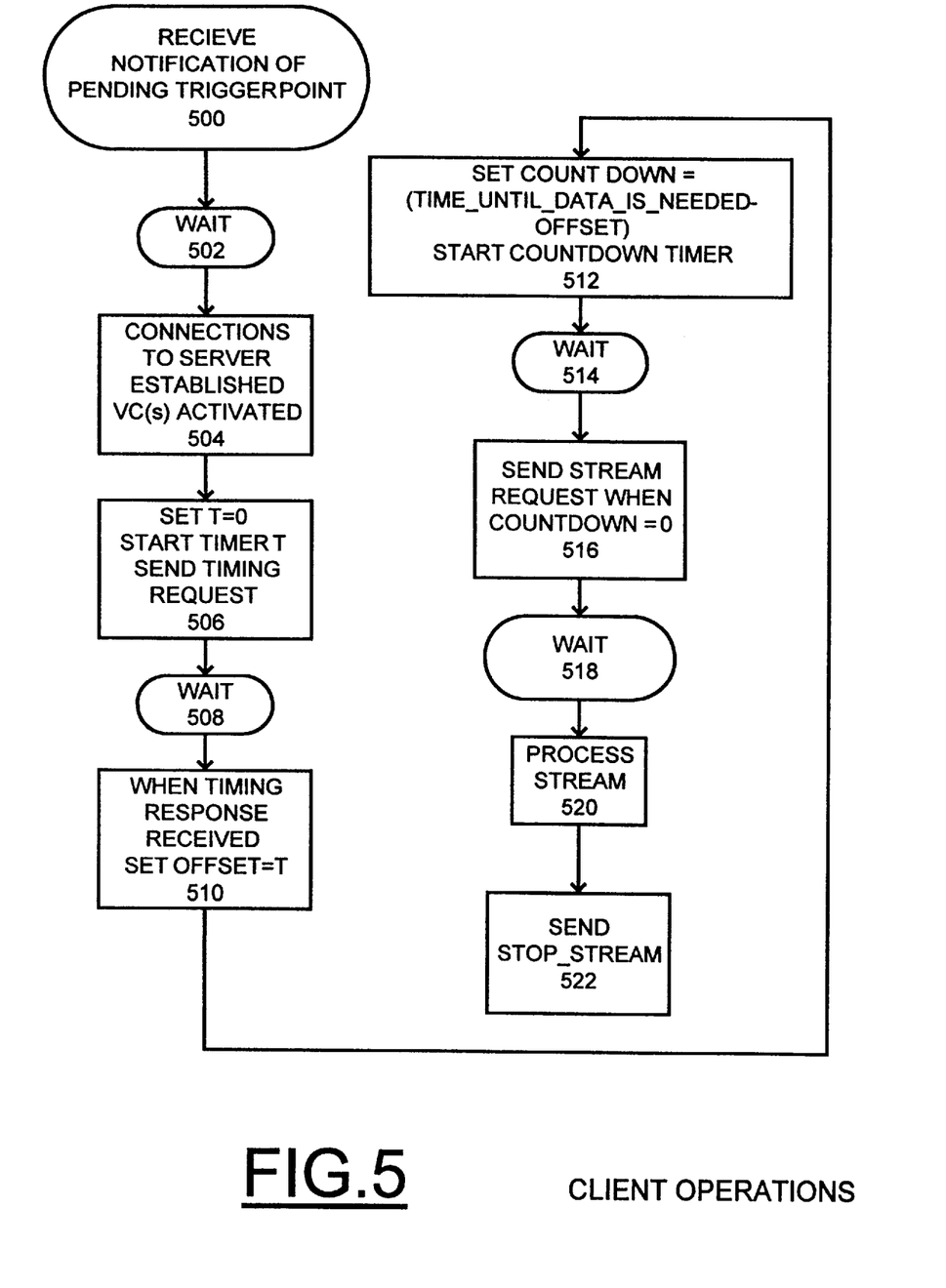
FIG. 5 is a flow chart illustrating logical steps performed by a server processor of the preferred ATM communications network system of the preferred embodiment of FIG. 2.

FIG. 5 illustrates logical steps performed by a client multiplexer 204 beg inning as indicated at a block 500 with a notification of a pending trigger point received. Then the client multiplexer 204 waits as indicated at a block 502. Connections to the server 202 are established and VCs are activated as indicated at a block 504. A timer is set to zero and started with a timing request being sent to the server 202 as indicated at a block 506. Then the client multiplexer 204 waits as indicated at a block 508. When a timing response is received from the sever 202, an offset is set to the lapsed time of the timer T as indicated at a block 510. Next a count down is set equal to the time until data is needed minus the set offset as indicated at a block 512. Then the client multiplexer 204 waits as indicated at a block 514. A stream request is sent when the count down equal zero as indicated at a block 516. Then the client multiplexer 204 waits as indicated at a block 518. The stream is processed as indicated at a block 520. A stop stream command is sent by the client 204 as indicated at a block 522.

Trigger manager 212 is necessary to start the flow of data from the server 202 to the multiplexer 204.

Various possible mechanisms can be used by the multiplexer 204 to instruct the server trigger manager 212 to start sending the data. For example, referring to FIGS. 7 and 8, using the VC 206 of FIG. 2 as a full duplex control path, using an ATM adaptation layer AAL5 to simply carry the trigger manager commands and responses as part of the AAL5 PDU payload or using the CPCS-UU (user-to-user) field of the AAL5 trailer to carry the trigger manager commands and responses. A full duplex control protocol can be carried by the service specific connection oriented protocol (SSCOP) on a separate VC, with the data channel 208 using a simplex VC for MPEG-2 traffic. The downstream direction of the data channel 208 is fully compliant with ATM Forum AMS Specification.

Figure 7:
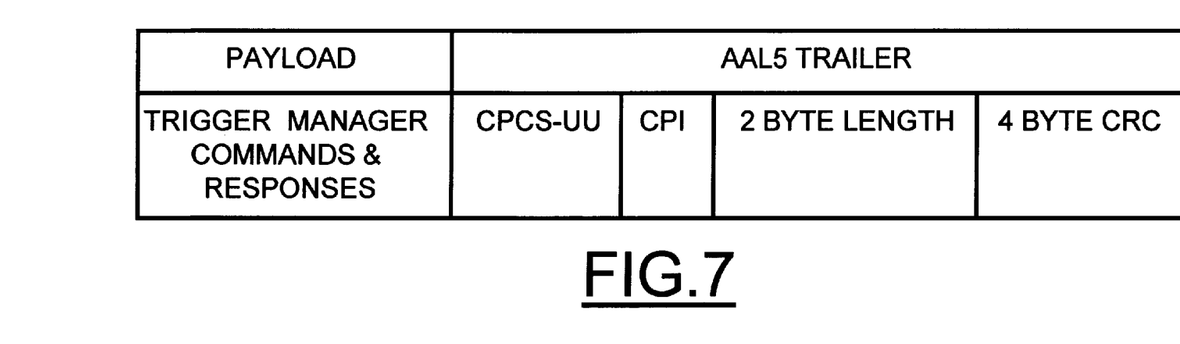
FIG. 7 is a chart illustrating trigger commands and responses carried in a payload section of an ATM AAL5 protocol data unit (PDU)

Referring to FIG. 7, the trigger manager commands and responses can be carried in the payload section of the AAL5 PDU.

Figure 8:
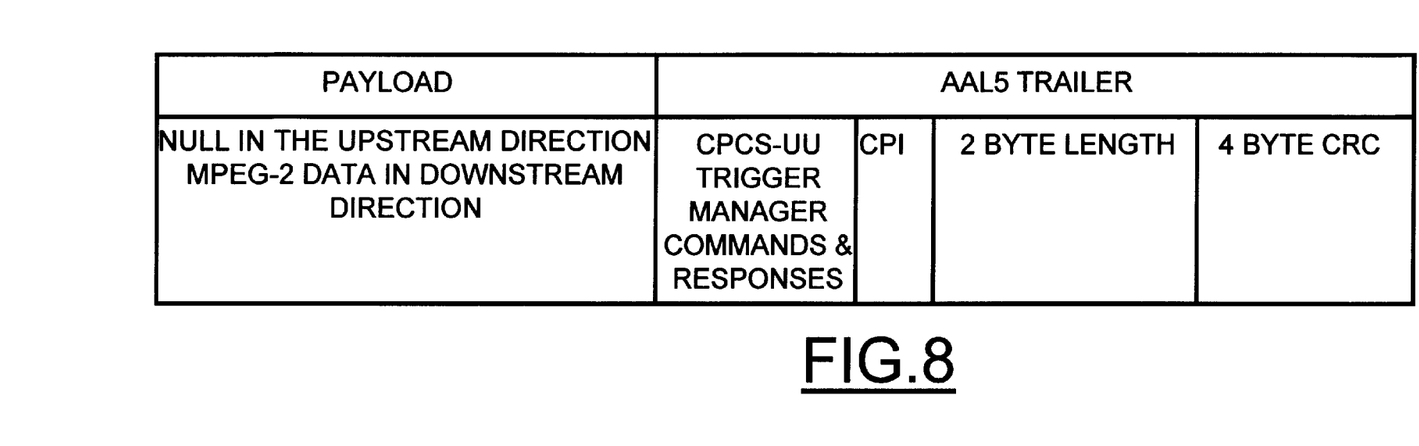
FIG. 8 is a chart illustrating an ATM AAL5 protocol data unit (PDU) format with trigger commands and responses carried in a user-to-user field (UU)

Referring to FIG. 8, another way of conveying the trigger manager commands and responses is shown using the AAL5 CPCS-UU field. The CPCS-UU field is in the AAL5 trailer and is used for user-to-user information. The preferred ATM communications network system 200 avoids the conventional requirement for synchronous electronic interfaces with the general purpose ATM subsystem 216, 224 providing the switching functions.

It should be understood that the server trigger manager functionality is a low level transmission control mechanism and is applicable to any environment where data can be enqueued prior to its transmission. An ideal location for the trigger manager functionality 212 would be controlling the cell scheduling algorithm at the ATM layer. Data could be queued to a particular VC but would not be transmitted until the stream request command is received. This would minimize any delay between receiving the command and the transmission of the data. In a preferred embodiment, trigger mechanisms and predicted response generation apparatus are used as disclosed in the above described U.S. Pat. No. 5,758,087 filed Jun. 14, 1996 by Aaker et al. that advantageously reduces latency and jitter of all response generation. The subject matter of U.S. Pat. No. 5,758,087 is incorporated herein by reference.

Figure 9:
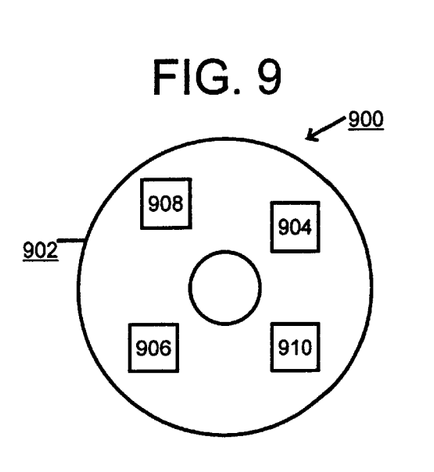
FIG. 9 is a block diagram illustrating a computer program product in accordance with the preferred embodiment.

Referring now to FIG. 9, an article of manufacture or a computer program product 900 of the invention is illustrated. The computer program product 900 includes a recording medium 902, such as, a floppy disk, a high capacity read only memory in the form of an optically read compact disk or CD-ROM, a tape, a transmission type media such as a digital or analog communications link, or a similar computer program product. Recording medium 802 stores program means 904, 906, 908, 910 on the medium 902 for carrying out the methods of this invention in the server system 200 of FIG. 2.

A sequence of program instructions or a logical assembly of one or more interrelated modules defined by the recorded program means 904, 906, 908, 910, direct the server computer system 200 to perform the queuing and triggering the flow of data across ATM networks, for example, to support such applications as inserting commercials into the MPEG-2 data stream.

In brief summary, the method and apparatus of the preferred embodiment, substantially reduces the buffering requirement at the client multiplexer 204 and provides improved performance, reducing the request/response time.

While the present invention has been described with reference to the details of the embodiments of the invention shown in the drawing, these details are not intended to limit the scope of the invention as claimed in the appended claims.

What is claimed is:

1. A method for queuing and triggering the flow of data across data communications networks including ATM networks utilizing an insertion server connected to a client multiplexer, said method performed by the insertion server comprising the steps of:
   receiving a notification of pending trigger point;
   enabling a trigger mode;
   preparing a timing response;
   enqueuing data;
   receiving a timing request from the client multiplexer and sending said timing response; and
   receiving a stream request from the client multiplexer and transferring said enqueued data to the client multiplexer.

2. A method for queuing and triggering the flow of data across data communications networks as recited in claim 1 includes the step of establishing an ATM network connection to the client multiplexer.

3. A method for queuing and triggering the flow of data across data communications networks as recited in claim 1 includes the step of receiving a stop stream command from the client multiplexer and stopping said enqueued data transfer to the client multiplexer.

4. A method for queuing and triggering the flow of data across data communications networks as recited in claim 1 includes the steps of establishing a transmit queue threshold and checking a data queue threshold.

5. A method for queuing and triggering the flow of data across data communications networks as recited in claim 4 includes the step of enqueuing data responsive to reaching said data queue threshold.

6. A method for queuing and triggering the flow of data across data communications networks as recited in claim 5 includes the step of checking for more enqueued data and transferring said enqueued data.

7. A method for queuing and triggering the flow of data across data communications networks as recited in claim 1 includes the step of predicting a next request from the client multiplexer and preparing a predicted next response.

8. A method for queuing and triggering the flow of data across data communications networks as recited in claim 7 includes the step of identifying a specific predicted next request from the client multiplexer and triggering said predicted next response.

9. Apparatus for queuing and triggering the flow of data across data communications networks comprising:
   an insertion server,
   a client multiplexer coupled to said insertion server; said insertion server including
   means for receiving a notification of pending trigger point;
   means for enabling a trigger mode;
   means for preparing a timing response;
   means for enqueuing data;
   means for receiving a timing request from said client multiplexer for sending said timing response to said client multiplexer; and
   means for receiving a stream request from said client multiplexer for transferring said enqueued data to said client multiplexer.

10. Apparatus for queuing and triggering the flow of data across data communications networks as recited in claim 9 wherein said insertion server includes means for receiving a stop stream command from said client multiplexer for stopping said enqueued data transfer to said client multiplexer.

11. Apparatus for queuing and triggering the flow of data across data communications networks as recited in claim 9 wherein said insertion server includes means for establishing a transmit queue threshold and means for checking a data queue threshold.

12. Apparatus for queuing and triggering the flow of data across data communications networks as recited in claim 11 wherein said insertion server includes means for enqueuing data responsive to reaching said data queue threshold.

13. Apparatus for queuing and triggering the flow of data across data communications networks as recited in claim 12 wherein said insertion server includes means for checking for more enqueued data for transferring said enqueued data.

14. Apparatus for queuing and triggering the flow of data across data communications networks as recited in claim 9 wherein said client multiplexer includes means for sending said timing request to said insertion server and for starting a timer; and means responsive to said timing response for establishing an offset.

15. Apparatus for queuing and triggering the flow of data across data communications networks as recited in claim 14 wherein said client multiplexer includes means utilizing said established offset for setting a count down timer.

16. Apparatus for queuing and triggering the flow of data across data communications networks as recited in claim 9 wherein said client multiplexer includes means for responsive to said count down timer for sending said stream request.

17. Apparatus for queuing and triggering the flow of data across data communications networks as recited in claim 9 wherein said client multiplexer includes means for processing said enqueued data transferred by said insertion server.

18. Apparatus for queuing and triggering the flow of data across data communications networks as recited in claim 9 wherein said client multiplexer includes means for sending said stop stream command to said insertion server.

19. A computer program product for use in an ATM network system having an insertion server and a client multiplexer, the computer program product comprising:
   a record medium;
   means, recorded on said recording medium, for receiving a notification of pending trigger point;
   means, recorded on said recording medium, for enabling a trigger mode;
   means, recorded on said recording medium, for preparing a timing response;
   means, recorded on said recording medium, for enqueuing data;
   means, recorded on said recording medium, for receiving a timing request and for sending said timing response; and
   means, recorded on said recording medium, for receiving a stream request and for transferring said enqueued data.

20. A computer program product for use in an ATM network system as recited in claim 19 includes means, recorded on said recording medium, for predicting a next request from a client and for preparing a predicted next response.

21. A computer program product for use in an ATM network system as recited in claim 20 includes means, recorded on said recording medium, for identifying a specific predicted next request from a client and for triggering said predicted next response.

22. An insertion server for queuing and triggering the flow of data across data communications networks including ATM networks to a client multiplexer, said insertion server comprising:

means for enabling a trigger operational mode;

means responsive to said trigger operational mode enabling means for setting a transmit queue threshold;

means for receiving a timing request from said client multiplexer for sending a timing response;

means responsive to said transmit queue threshold setting means for enqueuing data; and means for receiving a stream request from said client multiplexer for transferring said enqueued data to said client multiplexer.

23. An insertion server as recited in claim 22 further includes means for checking said data queue threshold and means for enqueuing data responsive to reaching said data queue threshold.

24. An insertion server as recited in claim 22 further includes means for receiving a stop stream command and for stopping said enqueued data transfer.

25. An insertion server as recited in claim 22 further includes means for predicting a next request from a client and for preparing a predicted next response.

26. An insertion server as recited in claim 25 further includes means for identifying a specific predicted next request from a client and for triggering said predicted next response.

27. A client multiplexer for triggering the flow of data across data communications networks including ATM networks from an insertion server, said client multiplexer comprising:

means for enabling a trigger operational mode;

means responsive to said trigger operational mode enabling means for sending a timing request to said insertion server and for starting a timer;

means responsive to receiving a timing response from said insertion server for establishing an offset;

means responsive to said trigger operational mode enabling means for sending a stream request to said insertion server;

means for receiving data from said insertion server and for processing said data; and means responsive to said data processing means for sending a stop stream request to said insertion server.

28. A client multiplexer as recited in claim 27 further includes countdown timer means responsive to said received timing response for identifying a time value utilizing said offset for sending said stream request to said insertion server.

* * * * *